Figure 1:
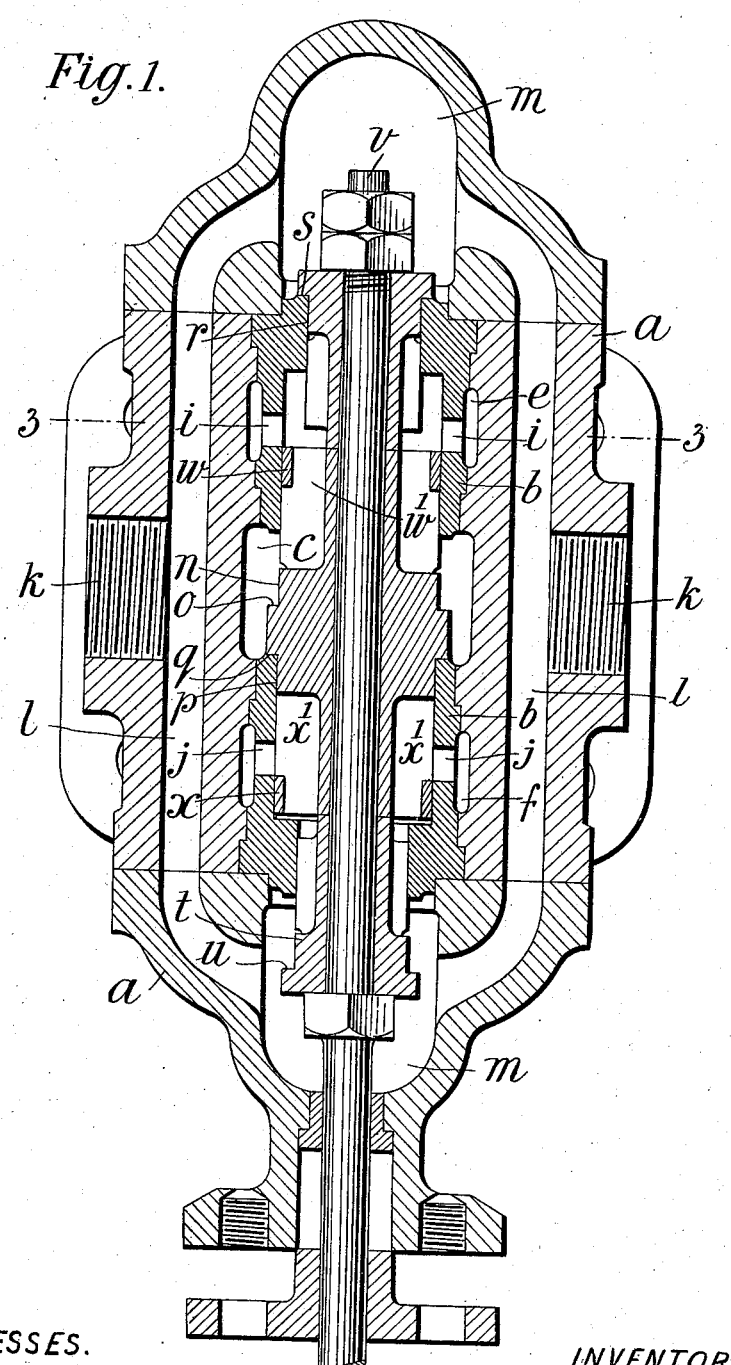

No. 867,774.  
PATENTED OCT. 8, 1907.

W. WEIR.  
VALVE FOR DIRECT ACTING STEAM PUMPS.  
APPLICATION FILED JUNE 7, 1907.

4 SHEETS—SHEET 1.

WITNESSES.

INVENTOR.

No. 867,774. PATENTED OCT. 8, 1907.
W. WEIR.
VALVE FOR DIRECT ACTING STEAM PUMPS.
APPLICATION FILED JUNE 7, 1907.

4 SHEETS—SHEET 3.

WITNESSES.

INVENTOR.

No. 867,774.  
PATENTED OCT. 8, 1907.

W. WEIR.  
VALVE FOR DIRECT ACTING STEAM PUMPS.  
APPLICATION FILED JUNE 7, 1907.

4 SHEETS—SHEET 4.

WITNESSES

INVENTOR

UNITED STATES PATENT OFFICE.

WILLIAM WEIR, OF GLASGOW, SCOTLAND.

VALVE FOR DIRECT-ACTING STEAM-PUMPS.

No. 867,774.　　　　　　Specification of Letters Patent.　　　　　　Patented Oct. 8, 1907.

Application filed June 7, 1907. Serial No. 377,796.

*To all whom it may concern:*

Be it known that I, WILLIAM WEIR, a subject of the King of Great Britain, residing at Glasgow, Scotland, have invented a certain new and useful Improvement in Valves for Direct-Acting Steam-Pumps and Like Machines, of which the following is a specification.

This invention relates to certain improvements in valves such as are usually employed for governing the inlet and exhaust ports of direct acting steam pumps and like machines. It has heretofore been proposed to employ for such purpose a series of valves mounted on the same spindle and each formed with a flange for bearing on a suitable seating when closed, as for example in Love's specification 10586 of 1901, in which it is also proposed to hold the valve spindle and valves in the desired position at the end of their travel by the steam pressure acting in opposite directions on surfaces of unequal area until the valve is mechanically moved in the same direction, and the present invention relates to improvements in valves of this general class with the object of rendering their working more positive, certain and efficient.

When one end of a valve such as described is just beginning to open to exhaust and the other end to steam its action is extremely sluggish, this being due to the slightness of opening caused by the inability of the valves to be acted on by the steam and carried to the full extent of their travel and opening until the pressure in the end of the cylinder open to exhaust has been reduced by its escape through the slight exhaust opening. It will thus be evident that the reversal of the valves to their most complete extent depends on the rate of reduction of pressure in the end of the cylinder open to exhaust, and as the capacity of the cylinder and its port is very considerable the action of the valve takes an appreciable time as the whole contents of the cylinder and port must be exhausted sufficiently to allow the steam pressure acting on the different areas of the valves to throw them to the full extent of their travel and opening.

According to the present invention provision is made whereby this difference of pressure on the valves is obtained independently or practically so of the rate of exhaustion of the whole contents of the cylinder and the valves are caused to move more quickly and give a more certain action to the pump or other apparatus and in addition reduce the time during which the valves are off their seating faces. To this end there is arranged between the steam and exhaust valves of each pair of valves a hollow or web-carried piston which moves with the valves and works in a chamber wherein is situated the port or cavity that admits steam and releases the exhaust from one end of the cylinder. These pistons work over the respective ports and are so set that the ports are closed when the valve is in its mid position. By this means these pistons provide an intermediate control of the passage of steam between the main steam valve and the cylinder port and the main exhaust valve. By their provision they therefore constitute a small chamber isolated from the main cylinder and located between each pair of steam and exhaust valves.

In order that the said invention may be clearly understood and readily carried into effect it will now be described more fully with reference to the accompanying drawings in which:—

Figure 2:
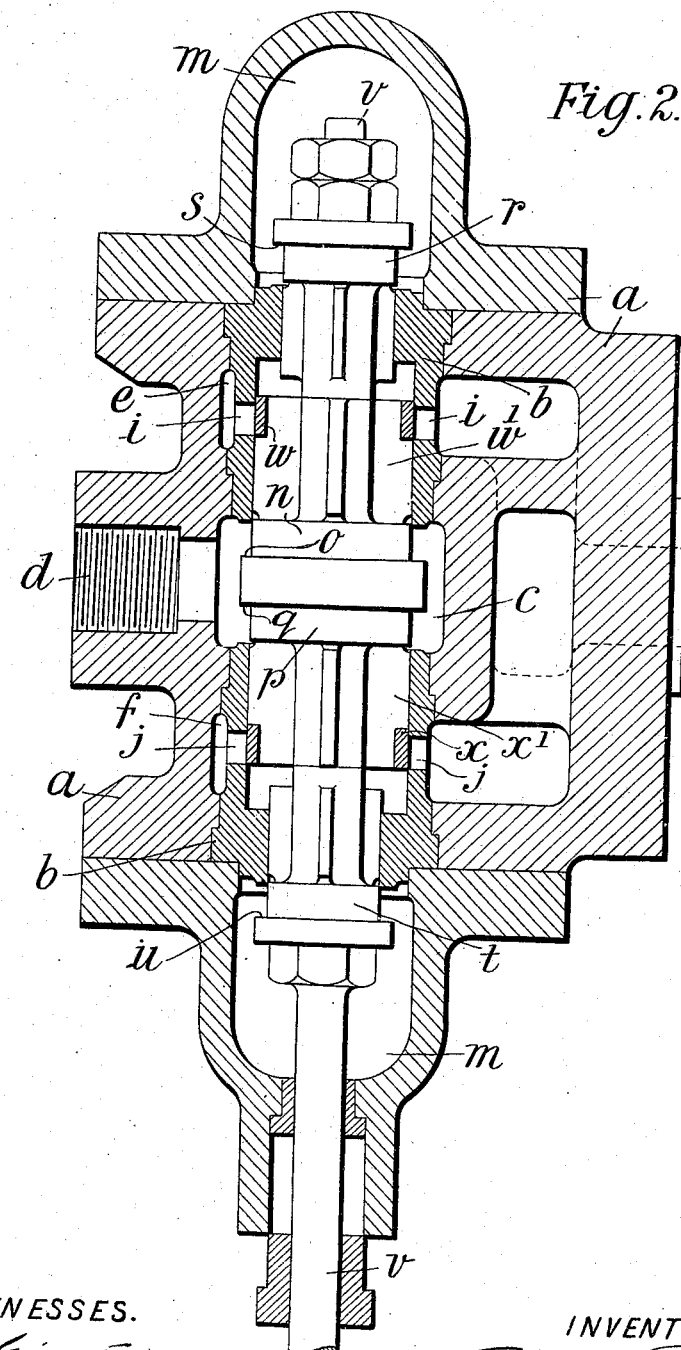
Figure 3:
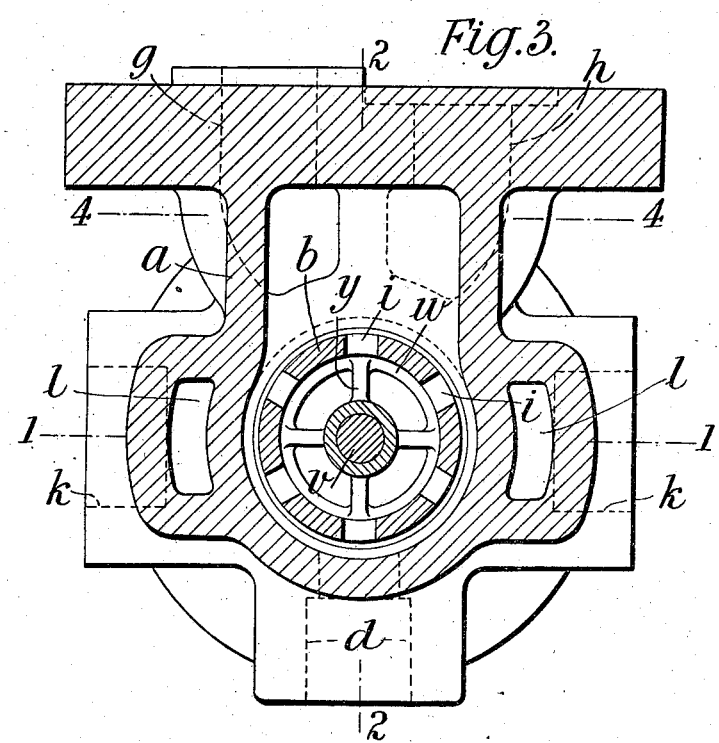
Figure 4:
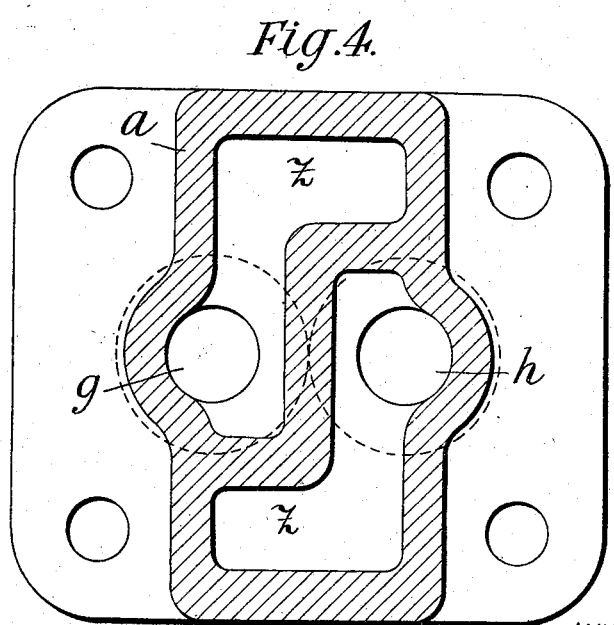
Figure 5:
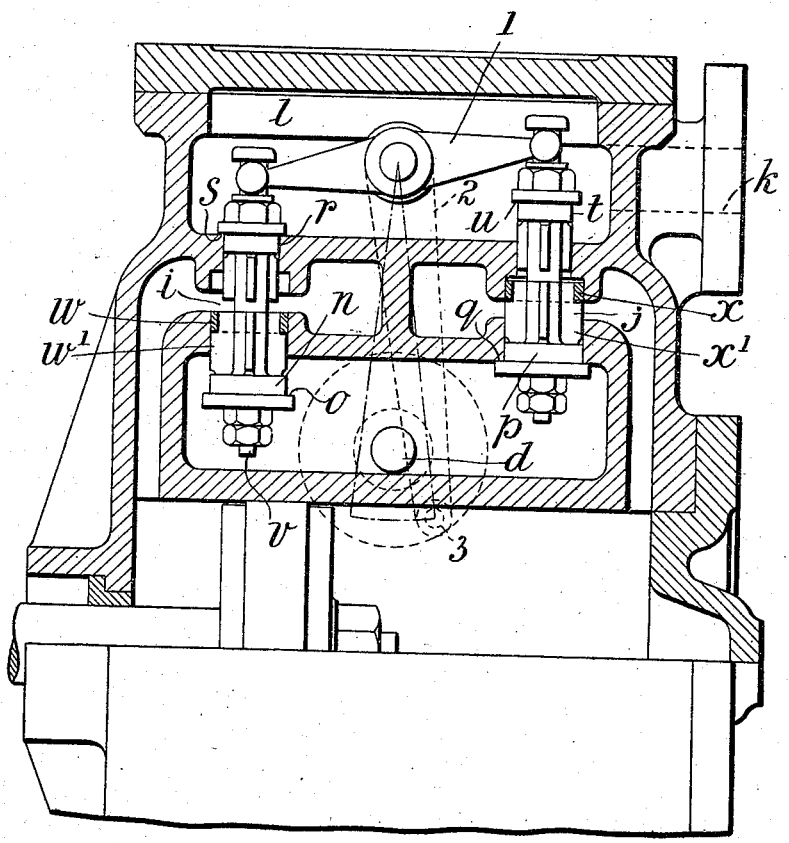

Figure 1 is a longitudinal section, taken approximately on the line 1—1 of Fig. 3, of a steam chest and valve embodying the features of the invention, the valve being represented in one of its extreme positions; Fig. 2 is a longitudinal sectional elevation of same in a plane at right angles to Fig. 1, that is to say on the line 2—2 of Fig. 3, with the valve however in a different position. Fig. 3 is a transverse section taken approximately on the line 3—3 of Fig. 1; Fig. 4 is a transverse section taken approximately on the line 4—4 of Fig. 3. Fig. 5 is a section illustrating a modified form of arrangement of the various parts of the valve.

Referring to the example shown in Figs. 1 to 4, $a$ is the steam chest inclosing a cylinder $b$ in which slides the valve hereinafter described; $c$ is an annular recess therein, communicating with the interior of the cylinder $b$ in the manner hereinafter described and with the live steam inlet $d$. On both sides of the steam inlet recess $c$ are similar recesses $e$ and $f$ which communicates with opposite ends of the main engine cylinder by means of steam passages $g$ and $h$ respectively and open into the cylinder $b$ through ports $i$ and $j$. $k$ $k$ are exhaust ports or outlets, which in the example illustrated are provided on each side of the steam chest and communicate with the ends of the cylinder $b$ by means of passages $l$, $l$ and exhaust boxes $m$, $m$.

The valve combination comprises two steam valves $n$ and $p$ having seating faces or shoulders $o$ and $q$ respectively, and two exhaust valves $r$ and $t$ likewise having seating faces or shoulders $s$ and $u$. These valves with their faces or shoulders may be formed either in a single piece or separately, and they are secured to the spindle $v$ which is actuated by any suitable mechanical means (not shown) from the main engine rod.

$w$ and $x$ are hollow valve pistons for forming the small chambers $w'$ and $x'$ above referred to, which chambers respectively have to be exhausted before the valve is thrown over by the steam pressure acting from one or the other end of it. The pistons $w$ and $x$ are carried by the webs $y$, $y$ upon the spindle, the piston $w$ being situated between the valves $n$ and $r$, and the piston $x$ between the valves $p$ and $t$, so that in the mid position of the valve the said pistons will cover and close the ports $i$ and $j$.

Fig. 1 shows the steam valves and exhaust valves in section and at the end of their travel, the valve faces $q$ and $s$ being seated, while the valve faces $o$ and $u$ are open. In this position of the valve the main engine cylinder receives steam to one end from the annular steam recess $c$ through the valve $n$, chamber $w'$, port $i$, recess $e$ and passage $g$, while the other end of the cylinder is exhausting through the passage $h$, recess $f$, port $j$, chamber $x'$, valve $t$, passage $l$ and outlet $k$; the lead from the ports $i$ and $j$ to the respective outlets $g$ and $h$ being shown at $z$, $z$ in Fig. 4. Fig. 2 shows the valve just past its mid position.

In the operation of the valve the pistons $w$, $x$ work in the chambers $w'$, $x'$, and over the ports $i$ and $j$, and are so set that when the valve (that is to say, the combination of valves) is just over the mid position as shown in Fig. 2, such pistons will close both the ports $i$ and $j$ and will thereby shut off the small chambers $w'$ and $x'$ from the passages $g$, $h$ and from the main engine cylinder. The motion of the spindle, imparted thereto by the main engine piston through the intervention of the valve gear, begins just as the main engine piston nears the end of its stroke, and, as is well known, the valve will be moved by the momentum or inertia slightly past the mid position, where the steam valve $n$ is just entering, that is, closing the inlet end of the chamber $w'$ and the steam valve $p$ is just leaving or opening the corresponding end of the chamber $x'$. At the same time the exhaust valve $r$ will be leaving (that is, opening) the upper exhaust end of the chamber $w'$, and the other exhaust valve entering, or closing, the exhaust end of the chamber $x'$. In this position of the valve combination any difference of pressure between the steam inlet chamber $d$ and the small chamber $w'$ will steam throw the combination until the steam valve face $o$ seats itself. The slightness of the opening of the valve $r$ would cause an appreciable period of time to elapse prior to the steam throwing of the valve if such opening were in communication with, and therefore were required to reduce the pressure in the passage $g$ and the main engine cylinder. It is to obviate this loss of time that the pistons $w$ and $x$ have been provided, it being obvious that at this critical moment the piston $w$ will have closed the chamber $w'$ against the main engine cylinder, and that therefore the pressure rapidly will fall in said chamber so that the valve can be steam-thrown. The pistons $w$ and $x$ are preferably given a slight amount of lap over the ports $i$ and $j$ when in the mid position to secure a more perfect isolation of the chamber $w'$.

In the modified form shown in Fig. 5, the valves in place of being in line, are arranged in pairs and are coupled together by a beam or rocking lever 1 which is actuated by a swinging lever 2 and crank 3 or other appropriate mechanism. In other respects, however, the operation of the device is similar to that shown in the previous example, and like letters of reference indicate like parts in both cases, the essential feature being that the arrangement comprises the provision of the intermediate piston to momentarily isolate the chambers $w'$ and $x'$ from the main engine cylinder.

When the four valves are in line it will be understood that the steam valves and the exhaust valves are of different areas to secure a differential area on which steam may act to throw the valves, but if the valves are in pairs side by side, the valves if desired may be of equal area.

If preferred, instead of the valves being of the combined piston and shoulder or flange type, they may simply be of the piston type, the shoulder being formed in the casing, in which event the seating face would be the end of the chamber in which the piston works and such construction is suitable for various arrangements of valves.

What I claim is:—

1. In a valve for direct acting steam engines and like machines a steam valve member; an exhaust valve member; a cylinder inclosing same and having supply and exhaust ports and an intermediate port; and a valve member adapted to close said intermediate port.

2. A steam chest, a steam valve therein, an exhaust valve movable synchronously therewith, a main engine cylinder, means for connecting same with the steam chest and means whereby in a predetermined position of the said valves said connecting means is closed.

3. A steam chest or valve box, an admission valve; an exhaust valve; and a plurality of valves for the outlet of live steam; said last named valves being arranged to be temporarily closed when the other valves are in certain predetermined positions.

4. A steam chest or valve box; an admission valve; a plurality of exhaust valves; a plurality of valves for the outlet of live steam; and means for actuating said several valves; the last-named valves being arranged to be closed when the other valves are in certain predetermined positions.

5. A steam chest or valve box; a plurality of admission valves; an exhaust valve; a plurality of valves for the outlet of live steam; and means for actuating said several valves; the last named valves being arranged to be closed when the other valves are in certain predetermined positions.

6. The combination with an engine cylinder of a steam chest or valve box having an admission port and an exhaust port and being in communication with the main engine cylinder; a steam valve, an exhaust valve and an intermediate valve, said intermediate valve being arranged to close the communication between the steam chest or valve box and the main engine cylinder when the other valves are in a predetermined position.

7. The combination with an engine cylinder of a valve device therefor comprising a steam chest or valve box having communication between its ends and the respective ends of the engine cylinder; a valve controlling the supply and exhaust of said steam chest or valve box, and means working synchronously with said valve for closing the aforesaid communication with the engine cylinder in a predetermined position of the valve.

8. The combination with an engine cylinder of a double acting inlet valve, a steam chest or valve box for same having on opposite sides of the inlet valve means for connecting with opposite ends of the engine cylinder according as said valve is moved towards one end or the other of its throw; means for exhausting the steam chest or valve box; and means intermediate an admission position and an exhaust position of the valve whereby the connection with the engine cylinder is closed.

9. The combination with an engine cylinder of an inlet valve; a steam chest or valve box for same having on opposite sides of the inlet valve means for connecting with opposite ends of the engine cylinder; means for actuating said valve; means for exhausting the steam chest or valve box at each end of the throw; and means whereby in an intermediate position of the valve the communication with the engine cylinder is closed.

10. The combination with an engine cylinder of a steam chest or valve box; a valve therein adapted to divide same into a plurality of chambers separated from each other, each of said chambers having means for connecting it with a respective end of the engine cylinder; means whereby when the valve is past its mid position the respective chamber can exhaust; and means whereby the chamber that is to exhaust is shut off from the engine cylinder.

11. The combination with a steam chest or valve box having a port admitting pressure fluid thereto, ports for exhausting same from either end thereof and ports intermediate the admission and each exhaust for the outlet of the live fluid; of a valve comprising an admission controlling member, exhaust controlling members and intermediate outlet controlling members.

12. The combination with a steam chest or valve box an inlet port, a plurality of exhaust ports and a plurality of live fluid outlet ports; of a valve comprising a plurality of inlet controlling parts, a plurality of exhaust controlling parts and a live fluid outlet controlling part.

13. The combination with a steam chest or valve box of an inlet port, an exhaust port and a live fluid outlet port; of a valve comprising a stem, an inlet controlling part thereon; an exhaust controlling part on said stem and a piston carried by said stem and adapted to control said live fluid outlet port.

14. The combination with a steam chest or valve box having an inlet port, an exhaust port and a live fluid outlet port, of a valve comprising a stem, a web carried thereby, a hollow piston carried by said web and adapted in a predetermined position of the valve to close said live fluid outlet port and means carried by said stem for respectively closing the inlet port and the exhaust port in other predetermined positions of the valve.

15. The combination with a steam chest or valve box having an inlet a plurality of end chambers communicating therewith and a lateral port leading from each of the end chambers; of a valve combination comprising means for temporarily opening one of the end chambers to the inlet and simultaneously cutting off the other end chamber therefrom, means for exhausting said cut off chamber, means for temporarily closing the lateral port of said exhausting chamber, and means for actuating the said parts of the valve combination in unison so as to alternately control the end chambers.

In testimony whereof I have hereunto set my hand in presence of two subscribing witnesses this 27th day of May 1907.

WILLIAM WEIR.

Witnesses:
GEO. M. DALZIEL,
J. D. IMRIE.